United States Patent [19]
Tsukamoto et al.

[11] Patent Number: 5,439,278
[45] Date of Patent: Aug. 8, 1995

[54] CAM ACTUATED ANTI-LOCK BRAKING SYSTEM MODULATOR

[75] Inventors: Masahiro Tsukamoto, Yokosuka; Masamichi Matuda, Yokohama, both of Japan

[73] Assignee: Nissan Motor Co., Ltd., Yokohama, Japan

[21] Appl. No.: 288,267

[22] Filed: Aug. 11, 1994

[30] Foreign Application Priority Data

Aug. 23, 1993 [JP] Japan .................. 5-229525
Nov. 13, 1993 [JP] Japan .................. 5-307470

[51] Int. Cl.[6] ............................. B60T 8/42
[52] U.S. Cl. .................. 303/115.2; 188/82.77; 188/162; 303/10; 303/116.4; 74/567; 74/569
[58] Field of Search ............ 303/115.2, 116.4, 3, 303/10, 15, 20; 188/82.7, 82.77, 162, 171; 74/569, 567, 55–60; 60/545, 594; 92/32

[56] References Cited

U.S. PATENT DOCUMENTS

| | | | |
|---|---|---|---|
| 2,062,805 | 12/1936 | Campbell | 188/82.77 |
| 3,942,843 | 3/1976 | Tobiasz | 303/115.2 |
| 4,653,815 | 3/1987 | Agarwal et al. | 303/100 |
| 4,673,225 | 6/1987 | Kade | 303/100 |
| 4,756,391 | 7/1988 | Agarwal et al. | 188/106 |
| 5,000,523 | 3/1991 | Mikhaeil-Boules et al. | 303/115 |
| 5,011,237 | 4/1991 | Matouka et al. | 303/115 |
| 5,026,126 | 6/1991 | Umasankar et al. | 188/162 |
| 5,071,202 | 12/1991 | Fabris et al. | 303/115.2 |

FOREIGN PATENT DOCUMENTS 3442503  5/1986  Germany .......... 303/115.2

*Primary Examiner*—Robert J. Oberleitmer
*Assistant Examiner*—Lee W. Young
*Attorney, Agent, or Firm*—Foley & Lardner

[57] ABSTRACT

An anti-lock braking system (ABS) pressure modulator is provided. The modulator includes a frame with a bore fluidly exposed to master cylinder and wheel cylinder connections and a check valve for preventing fluid communication from the master cylinder connection to the wheel cylinder connection vi the bore. A piston is slidably mounted within the bore and has a predetermined extreme position at which a stem of the piston opens the check valve. A power device is actuated by an ABS controller. A cam, moved by the power device, has a cam surface. The position of the piston is determined by the cam. A cam follower roller is connected with the piston to in contact with the cam surface. A one-way brake prevents rotation of the roller when the cam moves in one rotational direction to allow the piston to move away from the predetermined extreme position, but allowing the roller to roll over the cam surface when the cam moves in the opposite direction to move the piston toward the predetermined extreme position.

24 Claims, 7 Drawing Sheets

5,439,278

CAM ACTUATED ANTI-LOCK BRAKING SYSTEM MODULATOR

BACKGROUND OF THE INVENTION

The present invention relates to a pressure modulator for an anti-lock braking (ABS) system.

Anti-lock braking system controls the fluid pressure of the brake supplied to a wheel brake or cylinder to prevent the brake from locking up or skidding, therefore maximizing the stopping capabilities of a vehicle while allowing maximum maneuverability of the vehicle. Most anti-lock braking systems have a wheel speed sensor which provides an input to a controller. The controller outputs a signal when ABS operation is required. A pressure modulator of some type then takes over and in response to signal given by the controller applies, holds or decrease the pressure supplied to the wheel brake. One control algorithm is described in U.S. Pat. No. 4,673,225 issued on Jun. 16, 1987. Anti-lock braking system moudlators are shown and described in U.S. Pat. No. 4,653,815 issued on Mar. 31, 1987, U.S. Pat. No. 4,756,391 issued on Jul. 12, 1988, U.S. Pat. No. 5,000,523 issued on Mar. 19, 1991, U.S. Pat. No. 5,011,237 issued on Apr. 30, 1991, and U.S. Pat. 5,071,202 issued on Dec. 10, 1991.

An object of the present invention is to improve a cam actuated anti-lock braking system modulator such that a high efficiency simple drive including the cam moves a piston toward a predetermined extreme position.

SUMMARY OF THE INVENTION

There is provided an anti-lock braking system (ABS) pressure modulator for a braking system having a wheel cylinder and a master cylinder, the pressure modulator having connections for the wheel cylinder and the master cylinder, the pressure modulator comprising:

a frame having a bore fluidly exposed to the master cylinder and wheel cylinder connections and a check valve means for preventing fluid communication from the master cylinder connection to the wheel cylinder connection via said bore, said bore having a longitudinal axis;

a piston slidably sealably mounted within said bore for reciprocal movement along said longitudinal axis for providing a variable control volume in communication with the wheel cylinder and thereby modulating the pressure therein, said piston having means for opening said check valve means when said piston is at a predetermined extreme position, said piston having a cam follower surface;

power means; and a cam moved by said power means having a cam surface in contact with said cam follower surface of said piston whereby movement of said cam in a first rotational direction moves said piston toward said predetermined extreme position and the subsequent movement of said cam in a second rotational direction, opposite to said first rotational direction, allows said piston to move away from said predetermined extreme position. According to the present invention, said cam follower surface is in the form of a roller operatively associated with said piston, and a one-way brake means is operatively connected to said roller for preventing rotation of said roller when said cam moves in said second rotational direction, but allowing said roller to roll over said cam surface when said cam moves in said first rotational direction.

DETAILED DESCRIPTION OF THE INVENTION

Figure 1:
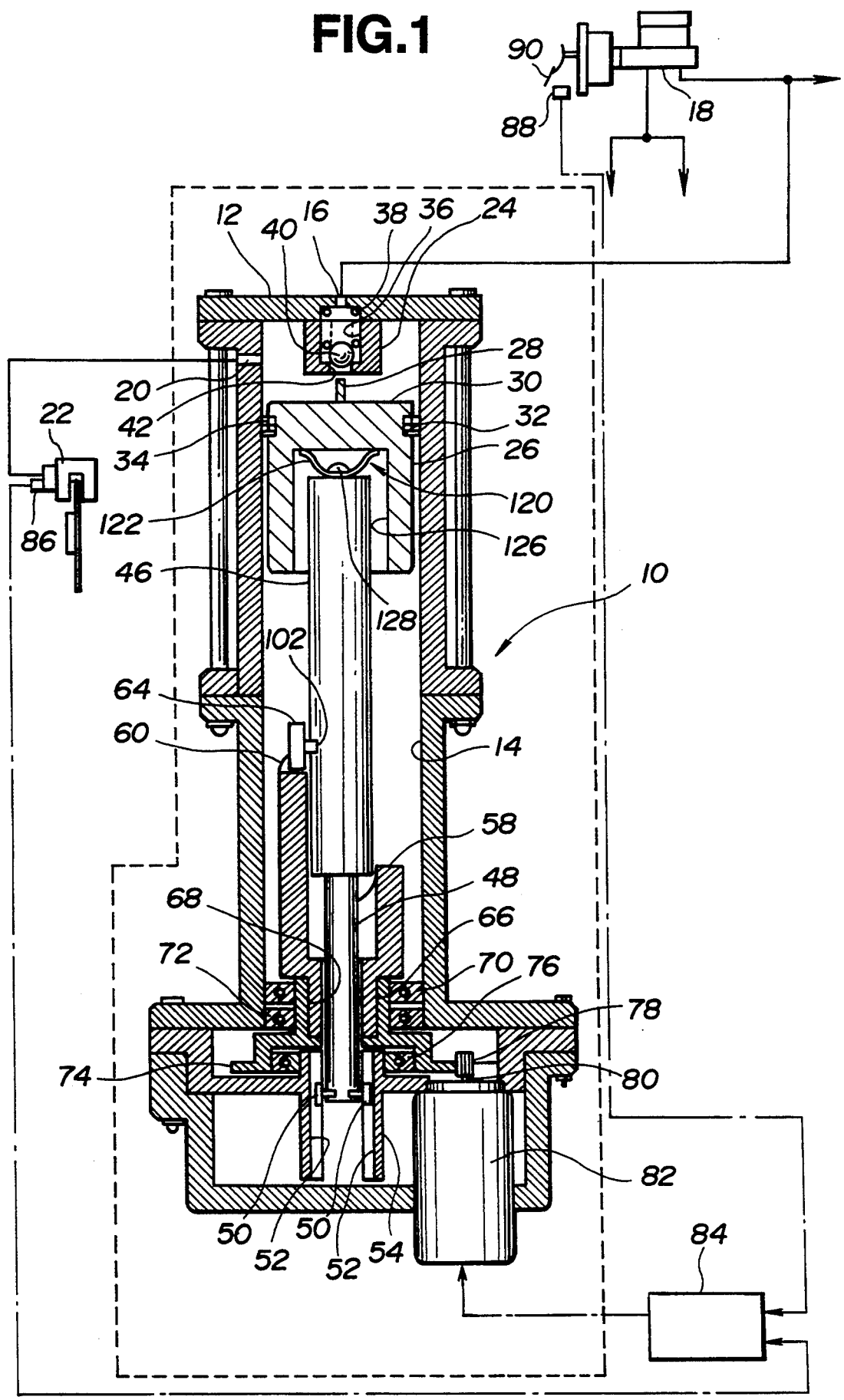
FIG. 1 is a schematic view, sectioned in part, of a preferred embodiment of the present invention for one vehicle wheel brake.

As illustrated in FIG. 1, the ABS pressure modulator 10 has a frame 12 with a central bore 14. The modulator 10 has a fluid connection 16 with a master cylinder 18. The modulator 10 also has a fluid connection 20 with a wheel cylinder or brake 22.

The central bore 14 is fluidly exposed to the master cylinder connection 16 via a check valve 24. In a similar manner, the central bore 14 is fluidly exposed to the wheel cylinder 22 via the fluid connection 20. Mounted within the central bore 14 is a sliding piston 26. The piston 26 has a stem 28 projecting from a head 30. Closely adjacent the piston head 30 is an annular groove 32 for an O-ring seal 34.

The check valve 24 has a bore 36 connected with the fluid connection 16. A spring 38 biases a check ball 40 downward as viewed in FIG. 1. The spring 38 and the ball 40 are mounted within the bore 36 which has an orifice 42 surrounded by a valve seat for the ball 40. The check valve 24 allows delivery of fluid back to the master cylinder 18 whenever the wheel cylinder 22 has a pressure greater than that in the master cylinder 18. Therefore, the braking system is senstive to an operator releasing the foot brake.

A check valve opening means is provided by the stem 28 connected with the piston 26. When the piston 26 is at a predetermined extreme position, i.e., the top dead center (TDC) position, shown in FIG. 2, the stem 28 will contact and unseat the ball 40 allowing flow from the master cylinder 18 to the wheel cylinder 22 and vice versa.

The piston 26 is slidably and sealably mounted within the bore 14 for reciprocal movement along a longitudinal axis of the bore 14. Movement of the piston 26 provides a variable control volume in communication with the wheel cylinder 22, thereby modulating the pressure therein. A rod 46 is operatively associated and connected with the piston 26. The rod 46 is slidably mounted within the bore 14 in a non-rotative fashion.

The rod 46 has a downwardly projecting reduced diameter plunger 48 with a pair of sliders 50 mated with a pair of longitudinal interior grooves 52 of a sleeve 54 of a guide member 56 fixed to the frame 12.

To determine the position of the piston 26 within the central bore 14, there is provided a cam 58.

The cam 58, which is a cylindrical cam in this embodiment, is mounted within the bore 14 for rotation about the longitudinal axis of the bore 14. At the TDC position shown in FIG. 2, the piston head 30 contacts the check valve 24. The piston head 30 has a transverse surface groove (not shown) to allow flow past the check valve 24 to the wheel cylinder 22 when the brake system is in the normal mode of operation.

The rod 46 has a tangential cam follower surface 64.

In order to turn the cam 58, there is provided an end gear 66. The end gear 66 which is integral with the cam 57 in this embodiment meshes with an internally toothed ring gear 68 which is mounted by bearings 70 and 72 within the frame 12. The ring gear 68 is integral with an externally toothed large gear 74 mounted by bearing 76 on the sleeve 54. The large gear 74 meshes with a smaller pinion gear 78 which axially floats on a rotor shaft 80 of a reversible DC motor 82. The motor 82 is fixedly mounted to the guide member 56 of the frame 12 and responsive to signal from an ABS electronic controller 84. From this description, it will be noted that the motor 82, pinion gear 78, large gear 74, ring gear 68 and end gear 66 constitute power means actuated by the ABS controller 84.

A wheel speed sensor 86 in the wheel brake 22 determines the wheel rotational speed and a brake sensor 88 determines whether or not a brake pedal 90 of the vehicle is activated. Both sensors feed information to the ABS controller 84. The ABS controller 84 will be cognizant with the rotational condition of the wheel and will provide an appropriate signal in response thereto. The signal will place the brake system in an ABS mode of operation if the condition of the wheel is within preset parameters. The ABS mode of operation is initiated when the wheel speed sensor 86 detects a wheel lock condition.

The ABS mode of operation starts with a "dump" cycle. The motor 82 is actuated causing the cam 44 to turn and the piston 26 to retract. The retractive motion of the piston 26 causes the check valve 24 to shut off and isolate the wheel cylinder 22 from the master cylinder 18.

The motor 82 continues to rotate moving the piston 26 down. The brake fluid pressure in the wheel brake 22 and the braking force drop steadily. The controller 84 determines the end of wheel lock condition using the wheel speed sensor 86 and reverse the direction of the motor 82.

Now the "apply" cycle starts. The piston 26 starts to move up increasing the brake fluid pressure in the wheel cylinder 22 and the braking force until wheel lock is detected again. The controller 84 stores the value of the motor current at which this wheel lock happened and initiate the "dump" cycle.

The motor 82 is reversed and the "dump" cycle starts again. The "dump" cycle ends at the end of the wheel lock condition and then a new "apply" cycle starts.

During the "apply" cycle, the current of the motor 82 is limited by the controller 84 to the previously stored value unless a wheel lock condition is detected earlier. If no wheel lock occurs at the previously stored motor 82 current value, the current is increased in steps by the controller 84 until wheel lock happens again. The controller 84 stores this new value of the motor 82 current and initiates the next "dump" cycle.

The controller 84 uses the wheel speed sensor 86 and the motor 82 current as inputs to control the brake pressure. The relationship between the motor 82 current and the brake pressure is therefore a critical characteristic of the modulator 10.

Figure 5:
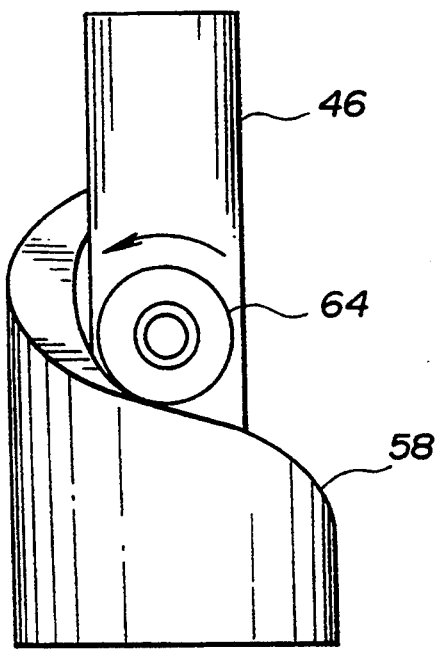
FIG. 5 is a partial view of the cam in operative association with a roller serving as a cam follower surface.

During each "dump" cycle, rotation of the roller 64 is prevented by a one-way brake 100, so that the roller 64 slides on the cam surface 60 as the cam 58 turns. During the subsequent "apply" cycle, the one-way brake 100 allows the roller 64 to rotate in the direction as indicated by an arrow in FIG. 5, so that the roller 64 rolls over the cam surface 60. Therefore, a coefficient of kinetic friction is low during "apply" cycle, while it is high during "dump" cycle.

The piston 26 is held in any position against the pressure force of fluid in the brake system, without any power being supplied to the motor 82. The profile of the cam 58 is such that the magnitude of a force component, tangential to the cam surface 60 of contact, of the piston force caused by the brake fluid pressure acting on the piston 26 is less than the magnitude of resistance which is expressed by the product of the coefficient of kinetic friction and the magnitude of a force component, normal to the cam surface 60 of contact, of the piston force. Assuming that there is an angle $\theta$ between a line normal to the cam surface 60 of contact and a line, parallel to the longitudinal axis of the bore 14, intersecting the normal line, this relation can be expressed as follows:

$$\tan \theta < \text{coefficient of kinetic friction.}$$

Owing to this cam profile, there is no resulting torque on the cam. Therefore, no holding torque is required, thus no supply of electric current to the motor 82 is needed.

Figure 3:
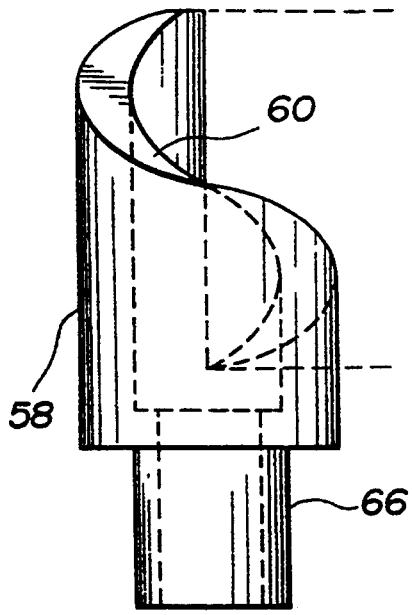
FIG. 3 is a front elevation of a cam used in FIG. 1.
Figure 4:
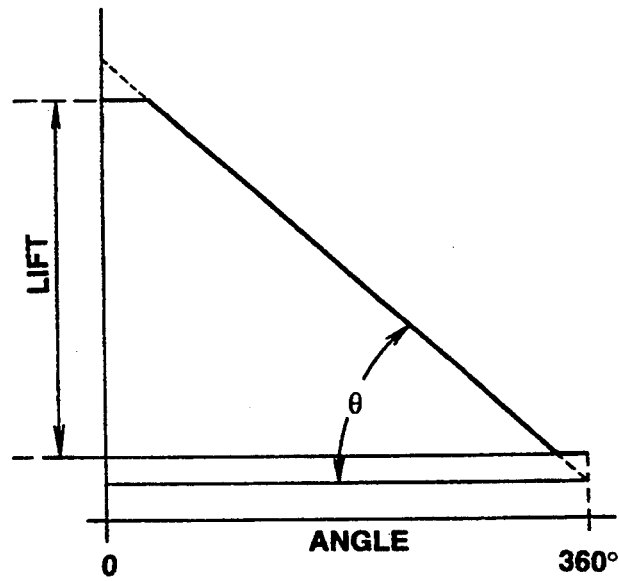
FIG. 4 is a cam lift diagram of the cam shown in FIG. 3.

The profile of the cam surface 60 according to this embodiment (see FIGS. 3 and 4) is designed such that the lift of the piston 26 is invariable over the whole ranges of the piston stroke from the BDC to the TDC. Thus, the relationship between the brake pressure and the motor torque, i.e., electric current supplied to the motor 82 is linear by virtue of this cam profile design.

The provision of the one-way brake 100 to provide low coefficient of kinetic friction during the piston stroke for "apply" cycle offers the advantage that the torque of the motor 82 for a given pressure output is minimized.

Figure 6:
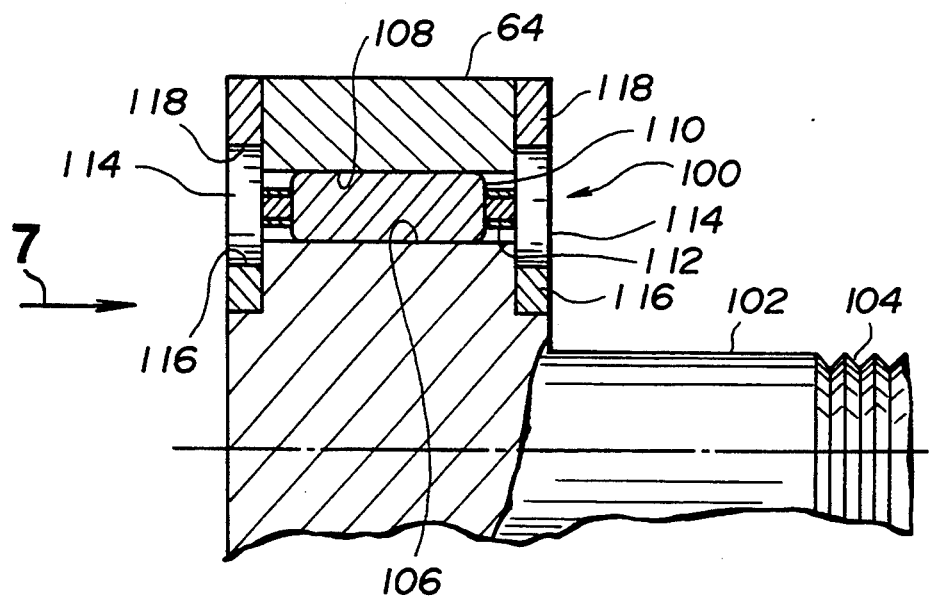
FIG. 6 is a sectional view taken through the line 6—6 of FIG. 7.
Figure 7:
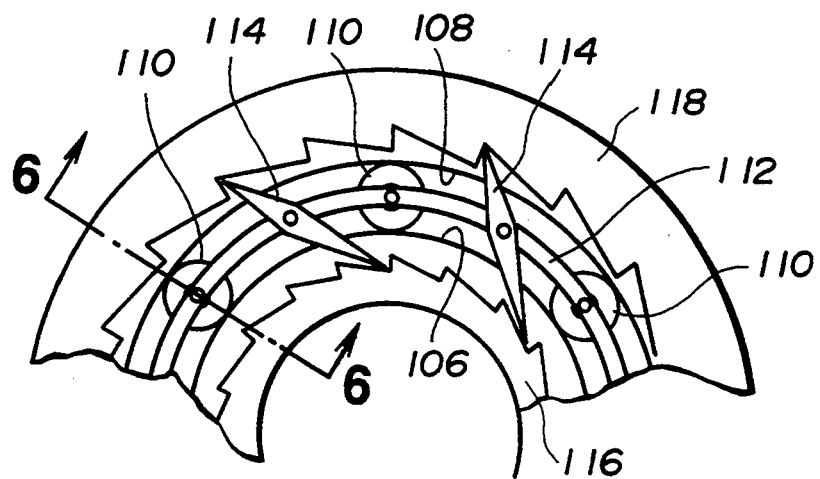
FIG. 7 is a partial side elevation viewing FIG. 6 along an arrow 7.

The one-way brake 100 and the roller 64 are assembled prior to mounting to the rod 46 for the piston 26. The assembly is fixedly attached to the rod 46 by means of a pin 102. As shown in FIGS. 6 and 7, the pin 102 is threaded at one end 104 for engagement with the rod 46 and has an opposite end carrying the roller 64. At the opposite end, the pin 102 defines an inner race 106 surrounded by an outer race 108 defined by the roller 64. A plurality of needle rollers 110 rotatably supported by a carrier 112 are disposed between in rolling contact with the inner and outer races 106 and 108.

To prevent rotation of the roller 64 clockwise viewing in FIG. 7, a plurality of spring biased pawls 114 are pivoted to the carrier 112, each being operatively disposed between an inner ratchet ring 116 fixed to the pin 102 adjacent the inner race 106 and an outer ratchet ring 118 fixed to the roller 64 adjacent the outer race 108. Each pawl 114 is adapted to fit into a notch of the inner ratchet ring 116 and a notch of the outer ratchet ring 118 to prevent clockwise, viewing in FIG. 7, rotational motion of the roller 64.

In the normal mode of operation or normal braking, the brake fluid pressure at the master cylinder 18 causes the wheel cylinder 22 to actuate and apply a braking force to the vehicle wheel through the check valve 24 which is held open by the stem 28 projecting from the head 30 of the piston 26.

The piston 26 is held in the predetermined extreme position (see FIG. 2) against the pressure force of the fluid in the brake system without any power being supplied to the motor 82 by virtue of the relation between the cam profile and the friction owing to the piston force caused mainly by the brake fluid pressure acting on the piston 26.

Figure 2:
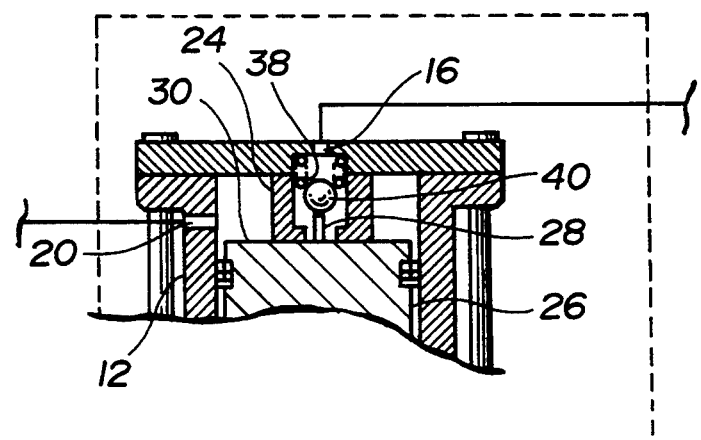
FIG. 2 is a partial view of FIG. 1 showing a piston at a predetermined extreme or top dead center (TDC) position.

In order to keep the friction when the piston 26 is in the position shown in FIG. 2, it is preferrable to provide a spring 120 (see FIG. 1) which is effective to bias the rod 46 downward at least when the piston 26 is in the position shown in FIG. 2. The spring 120 may be in the form of a Belleville spring 122, i.e., an initially coned disc spring, as shown in FIG. 1 or a coil spring 124 as shown in FIG. 8.

As shown in FIG. 1, the piston 26 has a bore 126 receiving the top portion of the rod 46. The Belleville spring 122 is fixed to the top of the rod 46 by a screw 128 and in abutting engagement with the bottom of the bore 126 in such a manner that, when the piston 26 is in the position shown in FIG. 2, the Belleville spring 122 is flattened to urge the rod 46 downward to give a piston force large enough to cause the friction. The stroke of the Belleville spring 122 is defined and limited by the head of the screw 126.

Figure 8:
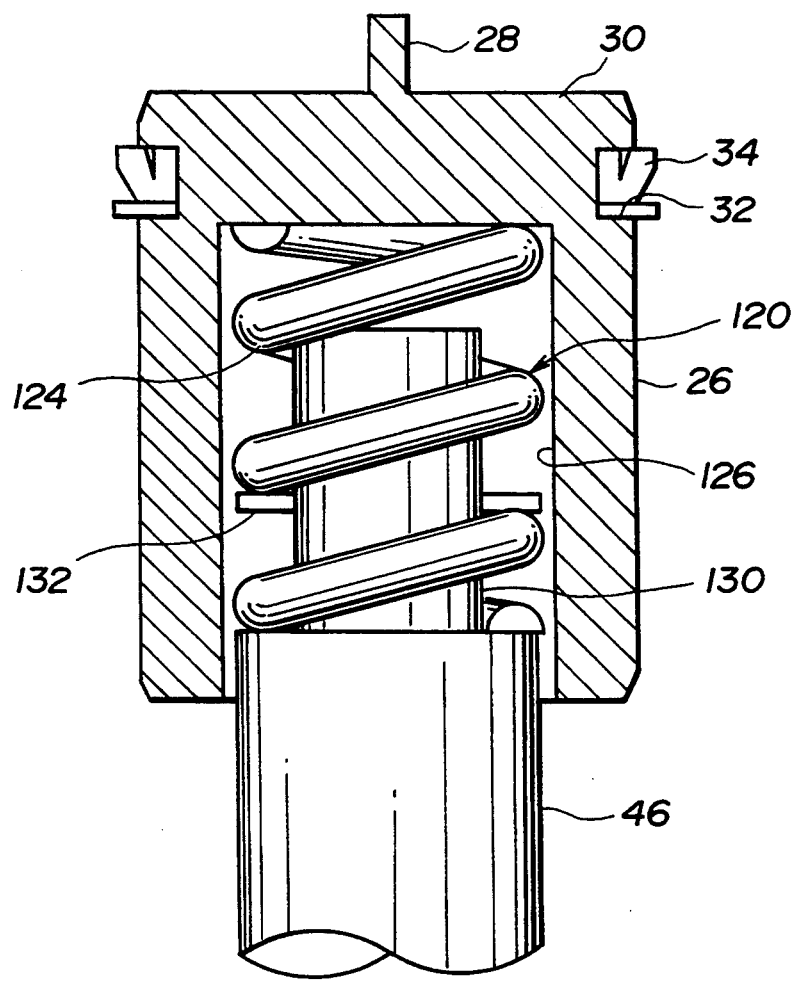
FIG. 8 is a fragmentary view, sectioned in part, of another embodiment of the present invention.

As shown in FIG. 8, the piston 26 has a projection 130 from the top of the rod 46, which projection 130 the coil spring 124 surrounds and held in position by means of a cotter pin 132. The coil spring 124 has its one and opposite ends bearing against the top of the rod 46 and the bottom of the bore 126, respectively.

Figure 9:
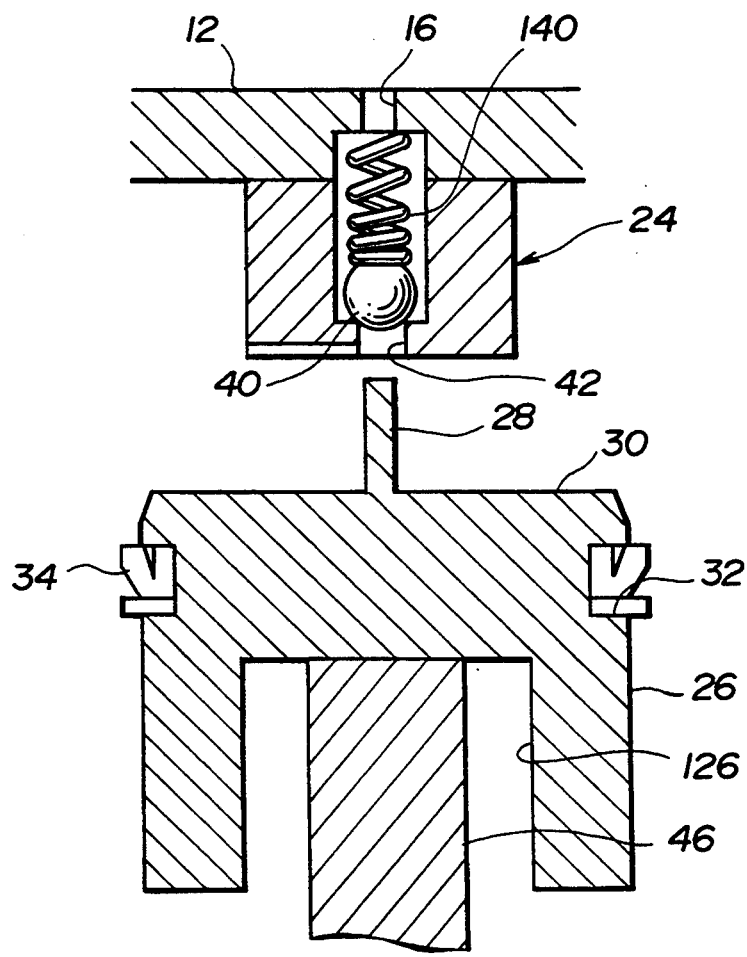
FIG. 9 is a partial sectional view of a further embodiment of the present invention.
Figure 10:
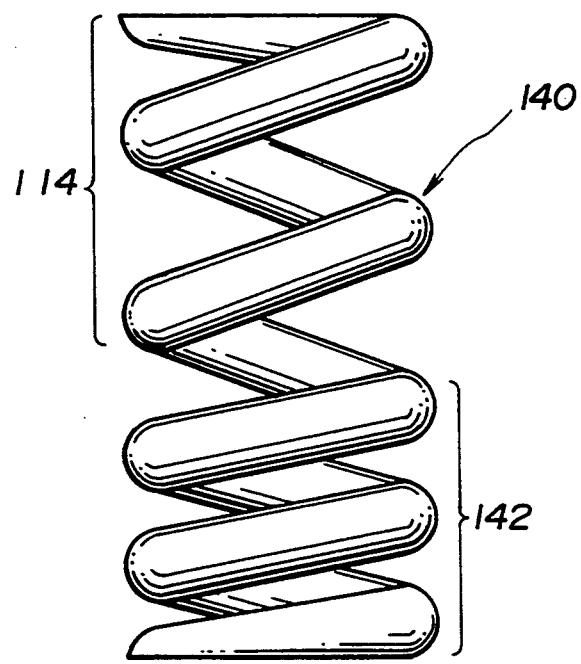
FIG. 10 is a view of a spring of a check valve used in FIG. 9.

Referring to FIG. 9, the rod 46 has its top in abutting engagement with the bottom of the bore 126 of the piston 26 for unitary motion therewith. In this embodiment, a multi-stage spring 140 is used instead of the spring 38 of the check valve 24 (see FIG. 1). As best seen in FIG. 10, this spring 140 is in the form of a coil spring and has a first stage portion 142 with a small pitch and a second stage portion 144 with a large pitch. In the ABS mode of operation as illustrated in FIG. 9, the first stage portion 142 is compressed to unseat the ball 40 to allow fluid flow from the wheel cylinder to the master cylinder when the brake pedal is released. When the piston 26 is at the predetermined extreme position (see FIG. 2), i.e., TDC position, the stem 28 presses the ball 40 compressing both the first and second stage portions 142 and 144. Compression of the second stage portion 144 of the spring 140 biases the piston 26 down via the ball 40 and stem 28, thus giving a piston force large enough to cause the friction. From this description, it will be understood that the multi-stage spring 140 of the check valve 24 in this embodiment is equivalent to the spring 120.

From the preceding description, it will be understood that the torque required for moving the piston 26 during "apply" cycle in the ABS mode operation has been minimized owing to the roller 64 rolling over the cam surface 60, thus minimizing a friction loss to provide increased transmission efficiency. As a result, the motor 82 can be miniturized and a gear ratio of the gear train between the cam 58 and the motor 82 can be made small.

The one-way brake 100 prevents rotation of the roller 64 to provide the high coefficient of kinetic friction during "dump" cycle, and allows rotation of the roller 64 to provide low coefficient of kinetic friction during "apply" cycle. The spring means for biasing the pivoted pawls 114 in the one-way brake 100 yields a torque opposed to the torque of the motor 82. However, the torque, which itself is small, given by the pawl biasing spring means is negligible since the one-way brake 100 is operatively disposed between the gear train and the piston 26.

What is claimed is:

1. An anti-lock braking system (ABS) pressure modulator for a braking system having a wheel cylinder and a master cylinder, the pressure modulator having connections for the wheel cylinder and the master cylinder, the pressure modulator comprising:

a frame having a bore fluidly exposed to the master cylinder and wheel cylinder connections and a check valve means for preventing fluid communication from the master cylinder connection to the wheel cylinder connection via said bore, said bore having a longitudinal axis;

a piston slidably sealably mounted within said bore for reciprocal movement along said longitudinal axis for providing a variable control volume in communication with the wheel cylinder and thereby modulating the pressure therein, said piston having means for opening said check valve means when said piston is at a predetermined extreme position, said piston having a cam follower surface;

power means; and a cam moved by said power means having a cam surface in contact with said cam follower surface of said piston whereby movement of said cam in a first rotational direction moves said piston toward said predetermined extreme position and the subsequent movement of said cam in a second rotational direction, opposite to said first rotational direction, allows said piston to move away from said predetermined extreme position, characterized in that said cam follower surface is in the form of a roller operatively associated with said piston, and a one-way brake means is operatively connected to said roller for preventing rotation of said roller when said cam moves in said second rotational direction, but allowing said roller to roll over said cam surface when said cam moves in said first rotational direction.

2. A pressure modulator as claimed in claim 1, characterized in that a spring means is operatively associated with said cam follower roller for biasing said roller into contact with said surface of said cam.

3. A pressure modulator as claimed in claim 1, characterized in that said piston is operatively connected with a rod slidably mounted within said bore of said frame in a non-rotative fashion.

4. A pressure modulator as claimed in claim 3, characterized in that said roller and said one-way brake means are mounted to said rod.

5. A pressure modulator as claimed in claim 4, characterized in that a spring is operatively associated with said rod to keep friction between said roller and said cam surface.

6. A pressure modulator as claimed in claim 5, characterized in that said spring is in the form of a Belleville spring acting between said rod and said piston.

7. A pressure modulator as claimed in claim 5, characterized in that said spring is in the form of a Belleville spring fixed to said rod by a screw in abutting engagement with said piston.

8. A pressure modulator as claimed in claim 5, characterized in that said spring is in the form of a coil spring acting between said rod and said piston.

9. A pressure modulator as claimed in claim 5, characterized in that said piston is operatively associated with said rod via said spring.

10. A pressure modulator as claimed in claim 3, characterized in that said piston and said rod are connected with each other for unitary motion.

11. A pressure modulator as claimed in claim 10, characterized in that said check valve opening means is a stem projecting from said piston.

12. A pressure modulator as claimed in claim 11, chasracterized in that said check valve means includes a multi-stage spring means for biasing said rod via said stem and said piston to keep friction between said roller and said cam surface when said piston is at said predetermined extreme position.

13. A pressure modulator as claimed in claim 12, characterized in that said multi-stage spring is in the form of a coil spring having a first stage portion with a first pitch and a second stage portion with a second pitch that is larger than said first pitch.

14. A pressure modulator as claimed in claim 4, characterized in that said roller and said one-way brake means are assembled to form an assembly.

15. A pressure modulator as claimed in claim 14, characterized in that said assembly is fixedly attached to said rod by means of a pin.

16. A pressure modulator as claimed in claim 15, characterized in that said pin is threaded at one end thereof for engagement with said rod and has an opposite end carrying said roller.

17. A pressure modulator as claimed in claim 16, characterized in that said roller defines an outer race, while said pin defines at said opposite end thereof an inner race surrounded by said outer race.

18. A pressure modulator as claimed in claim 17, characterized in that said assembly includes a plurality of needle rollers rotatably supported by a carrier, said plurality of needle rollers being disposed between in rolling contact with said inner and outer races.

19. A pressure modulator as claimed in claim 18, characterized in that said assembly includes a plurality of spring biased pawls pivoted to said carrier, each pawl being operative disposed between an inner ratchet ring fixed to said pin adjacent said inner race and an outer ratchet ring fixed to said roller adjacent to said outer race and adapted to fit into a notch of said inner ratchet ring and a notch of said outer ratchet ring to prevent rotational motion of said roller in one direction.

20. A pressure modulator as claimed in claim 3, characterized in that said cam is in the form of a cylindrical cam and mounted within said bore for rotation about said longitudinal axis.

21. A pressure modulator as claimed in claim 20, characterized in that said power means include an end gear integral with said cam, an internally toothed ring gear rotatably mounted within said frame, an externally toothed gear integral with said internally toothed ring gear, a motor with a rotor shaft, and a pinion on said rotor shaft and meshing with said externally toothed gear, said end gear meshing with said internally toothed ring gear.

22. A pressure modulator as claimed in claim 21, characterized in that said frame has fixed thereto a guide member having a sleeve.

23. A pressure modulator as claimed in claim 22, characterized in that said motor is fixedly mounted to said guide member of said frame, and said externally toothed gear is mounted by bearing on said sleeve of said guide member.

24. A pressure modulator as claimed in claim 23, characterized in that said rod has a reduced diameter plunger with a pair of sliders mated with a pair of interior grooves of said sleeve of said guide member.

* * * * *